Nov. 22, 1927.
R. FORWOOD
1,650,437
ANTISKID ATTACHMENT FOR VEHICLE WHEELS
Filed Jan. 22, 1926
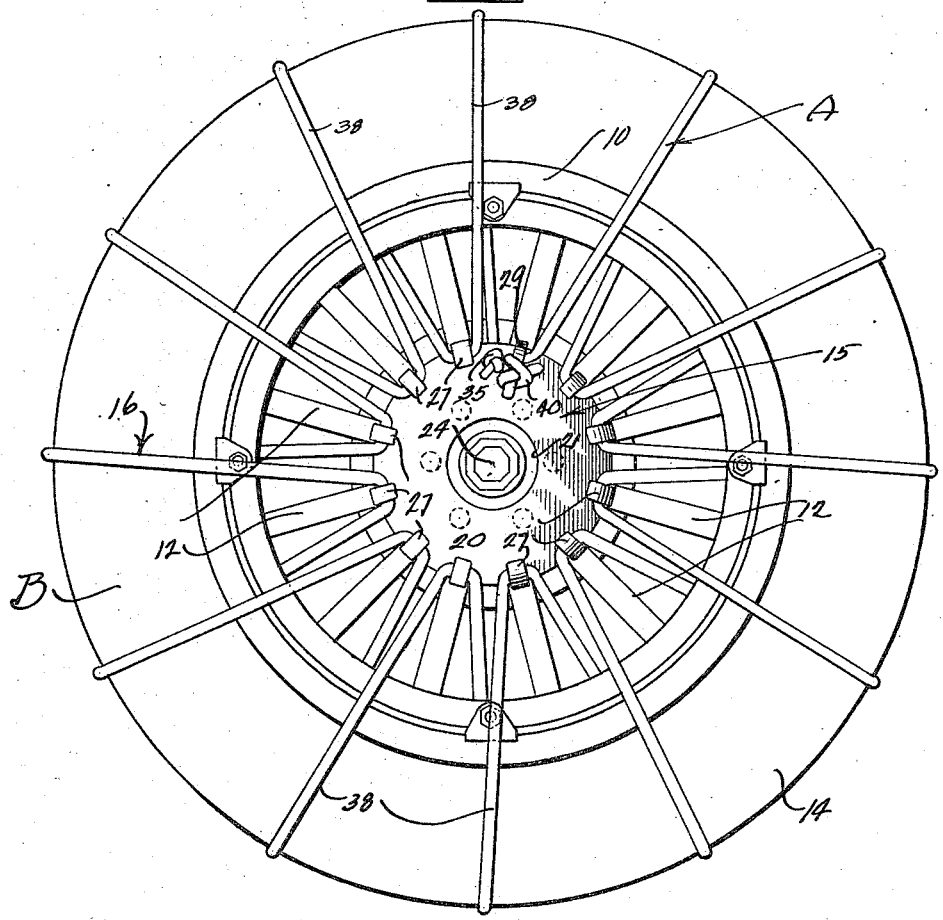
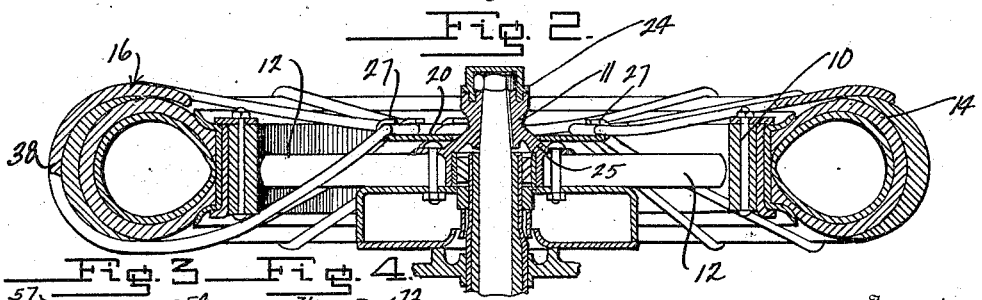
Inventor
Reginald Forwood
By Lancaster and Allwine
Attorneys Patented Nov. 22, 1927.

1,650,437

UNITED STATES PATENT OFFICE.

REGINALD FORWOOD, OF LITTLE ROCK, ARKANSAS.

ANTISKID ATTACHMENT FOR VEHICLE WHEELS.

Application filed January 22, 1926. Serial No. 83,054.

This invention relates to improvements in anti-skid attachments for vehicle wheels.

The primary object of this invention is the provision of a relatively simple and easily attachable anti-skid attachment for vehicle wheels.

A further object of this invention is the provision of an anti-skid device for motor vehicle wheels comprising a connecting member adapted to be positioned at the outer side of the vehicle wheel, and having means thereon for the engagement of portions of a relatively long non-skid member which may be wound spirally about the tread of the wheel to provide a plurality of non-skid convolutions, the ends of each convolution being disposed in a connected relation on the said member to hold the non-skid convolutions in position against slipping circumferentially about the wheel.

A further object of this invention is the provision of a simple, durable, and inexpensive anti-skid attachment for vehicle wheels, embodying a retaining disc adapted to be placed at the center of the wheel on the hub, for connecting the ends of anti-skid convolutions placed about the tire, to hold them in place.

Other objects and advantages of this invention will be apparent during the course of the following detailed description.

In the accompanying drawing, forming a part of this specification, and wherein similar reference characters designate corresponding parts throughout the several views, Figure 1 is a side elevation of a vehicle wheel showing the improved anti-skid attachment connected thereon.

Figure 2 is a sectional view taken thru the vehicle wheel, showing the relation of parts of the anti-skid attachment.

Figures 3 and 4 are side elevations of different modifications of retaining plates or disc members adapted to be used for supporting the flexible non-skid cable or member in position about the tread of the wheel.

In the drawing, wherein for the purpose of illustration is shown only a preferred embodiment of the invention, the letter A may generally designate the improved antiskid attachment adapted to be used upon a vehicle wheel B.

The wheel B may comprise a felly 10, connected in appropriate manner to a hub structure 11 by means of spaced radial spokes 12. The conventional solid or pneumatic tire 14 may be placed upon the felly in any approved relation.

Referring to the improved attachment A, the same in the preferred instance comprises a retaining disc 15 adapted to be placed at the outer side of the vehicle wheel, and embodying means for supporting the ends of the convolutions of the flexible anti-skid rope or cable 16, as will be subsequently described.

The disc or plate 15 is of any approved durable metal construction, and in the preferred instance is of a diameter which is considerably less than the diameter at the internal periphery of the felly 10, in order that the anti-skid cable 16 may be applied in spiraled relation about the tread of the wheel, without binding the same into any unnecessary surface engagement with the felly or the spokes. As illustrated in Figure 1 of the drawing, the plate or disc 15 may be approximately one-half the distance of the diameter of the internal periphery of the felly 10. The disc 15 preferably includes the plane or flat body portion 20, having the central opening 21 therein thru which the hub extension 24 may pass, in order that the disc 15 may lie as close to the plane of the spokes as desired, without abutting thereagainst. The opening 21 is therefore of a predetermined diameter, in order that the edges of the opening may abut against the tapered portion 25 of the hub extension, as illustrated in Figure 2 of the drawing to place the body portion 20 in a spaced relation with the plane of the spokes, as illustrated in Figure 2 of the drawing, and thus preventing the retaining plate 15 from rubbing against the spokes in a marring relation.

The body 20 is preferably provided with a plurality of spaced hooks 27 connected at the outer periphery thereof, and looping outwardly and radially of the disc body 20, at the outer side of the body 20, to provide hooks at the said outer side over which the anti-skid cable 16 may be attached. The hooks 27 are provided in uniformly spaced relation, and a hook 29 is employed for securing the last attached end of the anti-skid cable; this hook 29 having a relatively long cable connecting finger extending radially of the plane body 20 for a greater distance than the outer ends of the hooks 27 extend, as illustrated in Figure 1 of the drawing. The plate body 20 is preferably provided with a transverse opening adjacent the tie hook 29, thru which the opposite end of the anti-skid cable 16 extends to retain the same in place.

The anti-skid cable or member 16 is of course flexible, and it is preferably of one piece. It may be of cord; chain; wire rope; or any other approved durable flexible construction appropriate for the purpose. It may be in one piece or in separate pieces, although it is preferably of one piece. It is preferably connected permanently at one end to the body of the plate 15, although it may be detachable at this end if desired. In the preferred instance, as above mentioned, the body 20 of the plate 15 is provided with a transverse opening, and one end of the cable 16 is slipped thru this transverse opening (not shown), and knotted at 35, to retain said end in position.

Referring to the application of the attachment upon the vehicle wheel the plate or disc 15 is placed as above mentioned, at the outer side of the wheel, and the end of the cable 16 is placed with the knot 35 facing the outer side of the wheel, and the cable is then extended thru the space between adjacent spokes 12, and wound upwardly about the tread of the tire 14, and brought downwardly at the disc side of the wheel, and hooked beneath the adjacent hook 27, to provide a convolution 38 in the anti-skid member, engaging about the crown of the tire, which has an anti-skid effect during rotation of the wheel. The cable 16 is then extended between spokes of the wheel, and again wound about the tread of the tire and brought over to the disc side of the tire and hooked over another hook 27. The cable is thus continuously wound in spiraled relation about the tire of the wheel; to provide a plurality of convolutions, the ends of which are hooked over the hooks 27 to hold the anti-skid convolutions 38 in place. The convolutions 38 for the preferred construction comprise a single cable spirally wound about the tread of the tire, with the ends of the convolution brought to the outer side of the wheel and anchored at the plate or disc 15; one length of each convolution thus extending into the space between adjacent spokes in order to effect such an arrangement. The convolutions are tightened as the cable is spirally wound as above mentioned, and at the end of the cable after the convolutions have been wound as above mentioned, the same is provided with a suitable loop or slip knot 40, adapted to be engaged over the long finger of the loop 29, as illustrated in Figure 1 of the drawing.

I have found that it is preferable to provide four or more of the convolutions or anti-skid treads about the tire of the wheel, and it is practical to place twelve, and even more of such convolutions.

In lieu of the type of plate 15 above mentioned, a plate 50 such as illustrated in Figure 3 of the drawings, may be employed, made from a single flat piece of metal, having a hub receiving opening 51 centrally thereof, and providing a hub ring 52 in which said opening 51 is provided. An outer ring 53 is provided, connected with the inner ring 52 by radial connecting pieces 54, thus providing the cut-out portions 55 for reducing the weight of the disc or plate 50, and the expense of constructing the same. The outer ring 53 is provided with a plurality of transverse openings 56 therein to serve the function of the hooks 27 of the form of disc or plate 15, namely, that the anti-skid cable 16 may be threaded thru these openings 56, and the cable anchored at its starting end in a special opening 57 provided therefor.

A further modification is shown in Figure 4, which shows a plate or disc 60, of metal, similar in structural features to the disc 15, but larger in diameter than the same, and in order to economically construct the same, it is preferred to manufacture the same of inner and outer rings 62 and 63; the former having a hub opening 64 therein, and said rings being connected by radial arms 65 to hold the same in spaced relation; the openings 67 designating cut-away portions to reduce the weight and the expense of manufacturing the said disc or plate 60. At the outer periphery the ring 63 is provided with the hook extension 70 looping over at one side of the plate, and this ring is provided with the cable receiving opening 71 therein and long tie hook 72 similar to the tie hook 29 above mentioned.

It is preferred that the forms of disc or plates illustrated in Figures 3 and 4 be of considerably greater diameter than the plate 15, and therefore, they have been cut away to a certain extent to reduce the weight and expense of manufacture.

The retaining plates or discs are preferably formed of a single piece of metal, preferably stamped to form.

Various changes in the shape, size, and arrangement of parts may be made to the form of invention herein shown and described, without departing from the spirit of the same or the scope of the claims.

I claim:

1. In an anti-skid attachment for vehicle wheels the combination with a vehicle wheel including a hub having an extension at the outer side of the wheel, and a tire portion for the wheel, a retaining ring having a central opening therein adapted to receive the hub extension so that the ring may be placed at the outer side of the vehicle wheel, said retaining ring having a plurality of anchors marginally about the circumference thereof in spaced relation opening at the outer side thereof, and a relatively long anti-skid cable secured at its ends upon said ring and intermediate its ends being spiraled about the tire of the wheel in a plurality of convolutions, with the ends of the convolutions hooked over said anchors.

2. In an anti-skid attachment for vehicle wheels the combination with a vehicle wheel including a hub, a tire portion, and spokes radially extending from the hub towards the tire portion in spaced relation with each other, a retaining disc at the outer side of the wheel centrally disposed with respect to the hub, said disc having hooks thereon opening at the outer side of the wheel, and a flexible anti-skid cable in loop formation looped over the tread of the tire portion and extending therefrom and detachably looped intermediate its ends over the hook of the disc with portions of the loop extending freely through the spaces between the spokes of the wheel in non-engagement therewith.

3. In an anti-skid attachment for vehicle wheels the combination with a vehicle wheel including a felly, a hub, and means connecting the hub with the felly, the hub extending laterally beyond the plane of the last mentioned means in conventional manner, a flat retaining disc including a flat circular body the outer diameter of which is less than the diameter at the internal periphery of the wheel felly, said body having a central opening therein for removably receiving the hub of the wheel with a portion of the hub engaging about the periphery of said opening when the disc body is assembled against the outer side of the wheel, said disc body having spaced integral broad hooks thereon connected at the outer periphery of the body and radially extending inwardly of the periphery in spaced relation from the outer side of the disc body, the disc body from the circumferential edge of the opening of the body to the outer periphery of the body measured radially of the body being of a dimension several times the thickness dimension of the body, and anti-skid cable means detachably engaged over said hooks and extending therefrom about the outer surfaces of the wheel.

4. As an article of manufacture an anti-skid cable connecting member for vehicle wheels comprising a disc of sheet metal having a flat circular body of less total diameter than the normal diameter at the inner periphery of the felly of an ordinary vehicle wheel, said disc body having a central opening of just sufficient diameter to permit the reception of a vehicle wheel hub therein, said disc body having integral therewith relatively broad hooks connected at the outer periphery thereof and extending radially inwardly of said outer periphery in spaced relation at the outer side of the body, towards the central opening and terminating at their ends short of the central opening of the body.

REGINALD FORWOOD.